(No Model.)
G. D. LANGDON.
WAGON DUMP.
No. 584,786. Patented June 22, 1897.
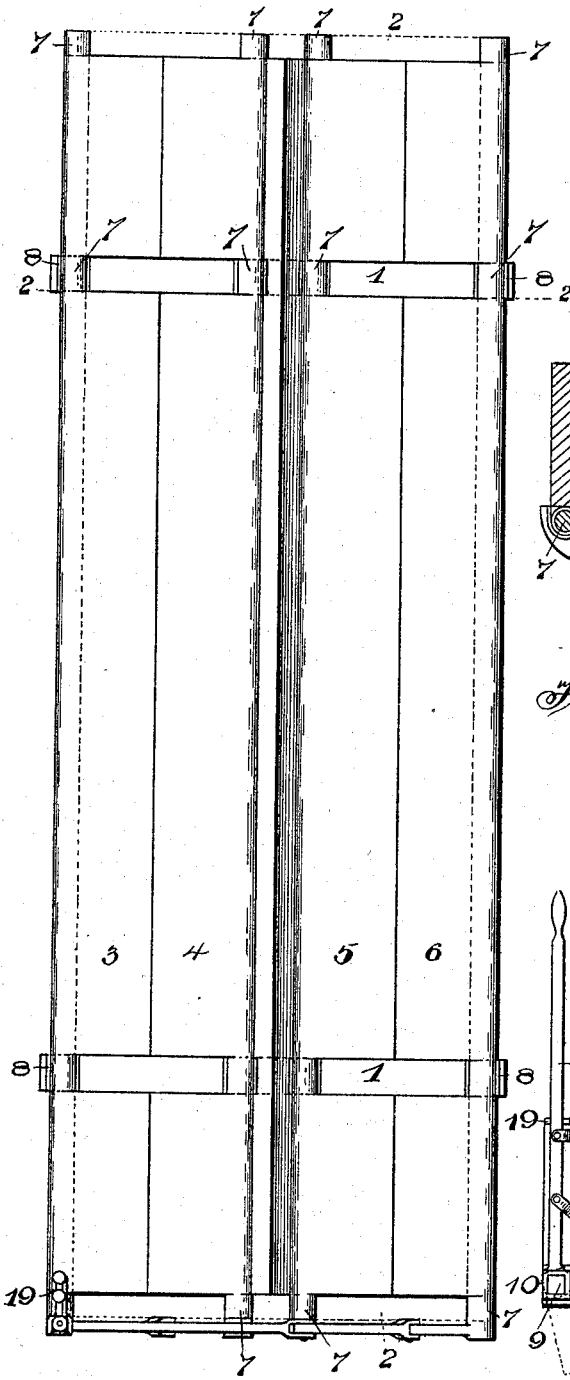
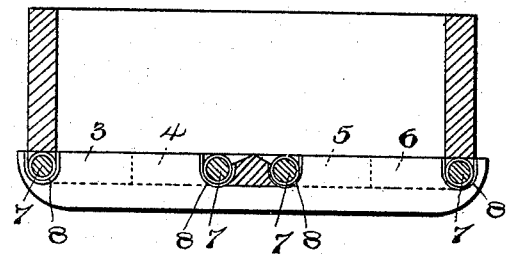
Fig. 2.
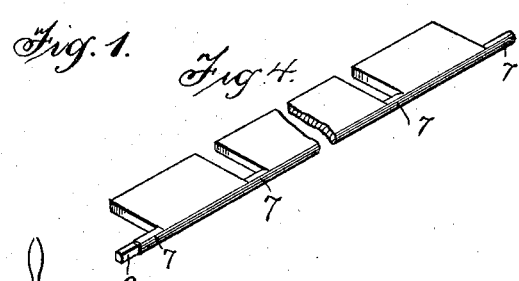
Fig. 1. Fig. 4.
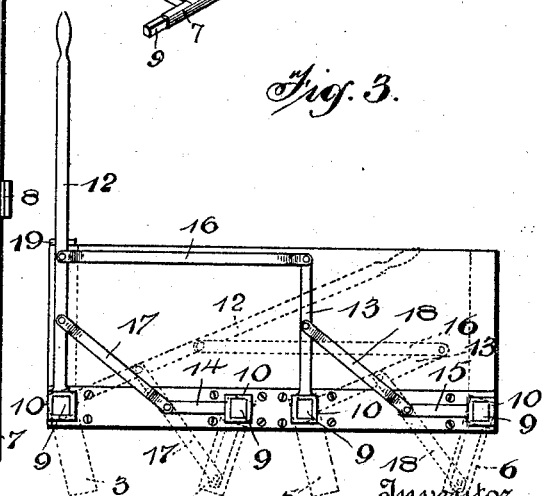
Fig. 3.
Witnesses
Wm. F. Doyle
F. A. Willson
Inventor
G. D. Langdon.
By H. B. Willson
Attorney
THE NORRIS PETERS CO., PHOTO-LITHO., WASHINGTON, D. C.

UNITED STATES PATENT OFFICE.

GEORGE D. LANGDON, OF HOMER, NEW YORK.

WAGON-DUMP.

SPECIFICATION forming part of Letters Patent No. 584,786, dated June 22, 1897.

Application filed January 9, 1897. Serial No. 618,630. (No model.)

*To all whom it may concern:*

Be it known that I, GEORGE D. LANGDON, a citizen of the United States, residing at Homer, in the county of Cortland and State of New York, have invented certain new and useful Improvements in Wagon-Dumps; and I do declare the following to be a full, clear, and exact description of the invention, such as will enable others skilled in the art to which it appertains to make and use the same.

My invention has relation to improvements in wagon-dumps; and the object is to provide a simple, convenient, and durable device of this class.

To this end the novelty consists in the construction, combination, and arrangement of the same, as will be hereinafter more fully described, and particularly pointed out in the claims.

In the accompanying drawings the same reference-characters indicate the same parts of the invention.

Figure 1 is a top plan view of a dump embodying my invention with the side-boards removed. Fig. 2 is a transverse section on the line 2 2 of Fig. 1. Fig. 3 is an end elevation showing in dotted lines the position of the dump when tipped. Fig. 4 is a perspective view of one of the hinged bed-boards detached from the wagon.

1 1 represent the cross-braces, and 2 2 the end braces.

3, 4, 5, and 6 represent the bed-boards, having cylindrical journals 7 7, which are mounted in corresponding bearings 8 8 in the end and cross braces, and their ends are formed with square shanks 9 9, which receive the square sockets 10 10 of the main levers 12 13 and the auxiliary levers 14 15.

The main levers 12 and 13 are connected by a pivoted bar 16. A pivoted bar 17 connects the lever 12 with the outer end of the lever 14, and a similar bar 18 likewise connects the body of the lever 13 with the end of the lever 15. The combined operation of the parts is such that when the lever 12 is vertical, as shown in Fig. 3, the bed-boards form a horizontal plane for the reception of the earth or gravel, and by throwing the lever 12 down, as shown in dotted lines, the bed-boards are simultaneously tilted to discharge their contents.

19 represents an ordinary slide-bolt secured to one of the sides of the wagon-body that engages the lever 12 to lock it in a vertical position when the wagon is being loaded or its contents being transported.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

1. A wagon-dump comprising the bed-boards journaled in the end and cross braces, and having their contiguous ends formed with square shanks 9, in combination with the levers 12 13 and 14 15, formed with square sockets 10 which engage the corresponding shanks of the bed-boards, the pivoted bars connecting said levers so as to simultaneously raise and lower said bed-boards, substantially as shown and described.

2. A wagon-dump, comprising the cross-braces 1 1, and the parallel end braces 2 2, provided with the semicylindrical bearings 8 8, in combination with the longitudinal parallel bed-boards 3, 4, 5 and 6, provided with cylindrical journals 7 7 mounted in the bearings in said cross and end braces, and having the integral square shanks 9 9, the main levers 12 13, having square sockets 10 10, and the auxiliary levers 14 14 having corresponding square sockets, the pivoted bar 16 connecting said main levers 12 13 and the pivoted bar 17 connecting the levers 12 and 14, and a bar 18 connecting the levers 13 and 15, substantially as shown and described.

In testimony whereof I hereunto affix my signature in presence of two witnesses.

GEORGE D. LANGDON.

Witnesses:
A. H. BENNETT,
F. H. ALVORD.